(12) United States Patent
Speckhart et al.

(10) Patent No.: US 6,290,030 B1
(45) Date of Patent: Sep. 18, 2001

(54) ELECTROMAGNETIC ANTILOCK BRAKE SYSTEM

(75) Inventors: Frank H. Speckhart, Knoxville; James A. Ridnour, Powell, both of TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/528,492

(22) Filed: Mar. 17, 2000

(51) Int. Cl.[7] .................................................. F16D 65/14
(52) U.S. Cl. ............................ 188/106 P; 303/3; 303/15
(58) Field of Search .................................. 188/326, 325, 188/78, 106 R, 106 F, 106 A, 106 P; 303/15, 3

(56) References Cited

U.S. PATENT DOCUMENTS

| | | | |
|---|---|---|---|
| 3,244,259 | * 4/1966 | Brede, III | 188/326 |
| 4,004,262 | * 1/1977 | Grove | 335/281 |
| 4,004,663 | * 1/1977 | Stibbe | 188/332 |
| 4,128,146 | * 12/1978 | Hubbard | 188/138 |
| 4,172,242 | * 10/1979 | Myers et al. | 335/209 |
| 4,336,867 | * 6/1982 | Woo | 188/326 |
| 4,664,233 | 5/1987 | Tsuchida et al. . | |
| 4,860,859 | * 8/1989 | Yamatoh et al. | 188/72.1 |
| 5,024,299 | * 6/1991 | Shaw et al. | 188/156 |
| 5,043,897 | 8/1991 | Yoshino . | |
| 5,074,388 | * 12/1991 | Dodd et al. | 188/156 |
| 5,127,495 | * 7/1992 | Verner et al. | 188/106 F |
| 5,150,298 | 9/1992 | Fujioka et al. . | |
| 5,150,773 | * 9/1992 | Hickey et al. | 188/79.55 |
| 5,219,049 | * 6/1993 | Unterborn | 188/156 |
| 5,292,183 | * 3/1994 | Russell | 303/2 |
| 5,401,086 | 3/1995 | Nishikimi et al. . | |
| 5,472,265 | 12/1995 | Ohnuma . | |
| 5,823,636 | * 10/1998 | Parker et al. | 303/3 |
| 5,913,390 | * 6/1999 | Hostetler | 188/79.51 |
| 5,924,529 | * 7/1999 | Ikeda et al. | 188/331 |

* cited by examiner

Primary Examiner—Douglas C. Butler
Assistant Examiner—Benjamin A. Pezzlo
(74) Attorney, Agent, or Firm—Duane, Morris & Heckscher LLP

(57) ABSTRACT

The present invention relates to an electromagnetic antilock brake system which comprises an electromagnetically actuated release arm capable of adjusting the position of a cam or other motion linkage to result in a controlled application of brake shoes to a brake drum. The invention further comprises a control system for controlling the actuation and release of the ABS.

20 Claims, 10 Drawing Sheets

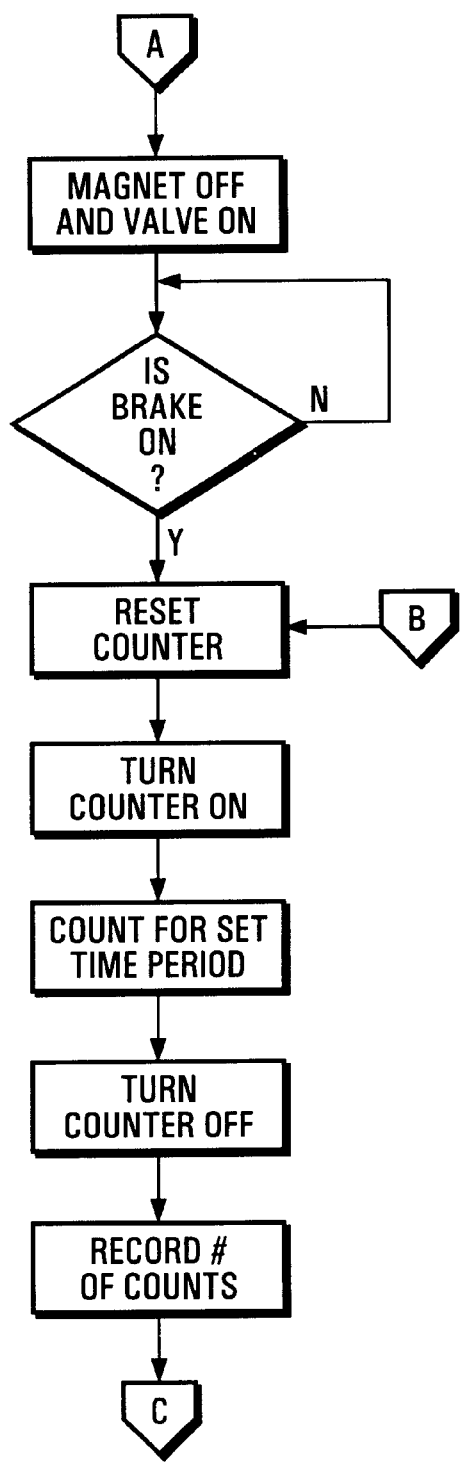 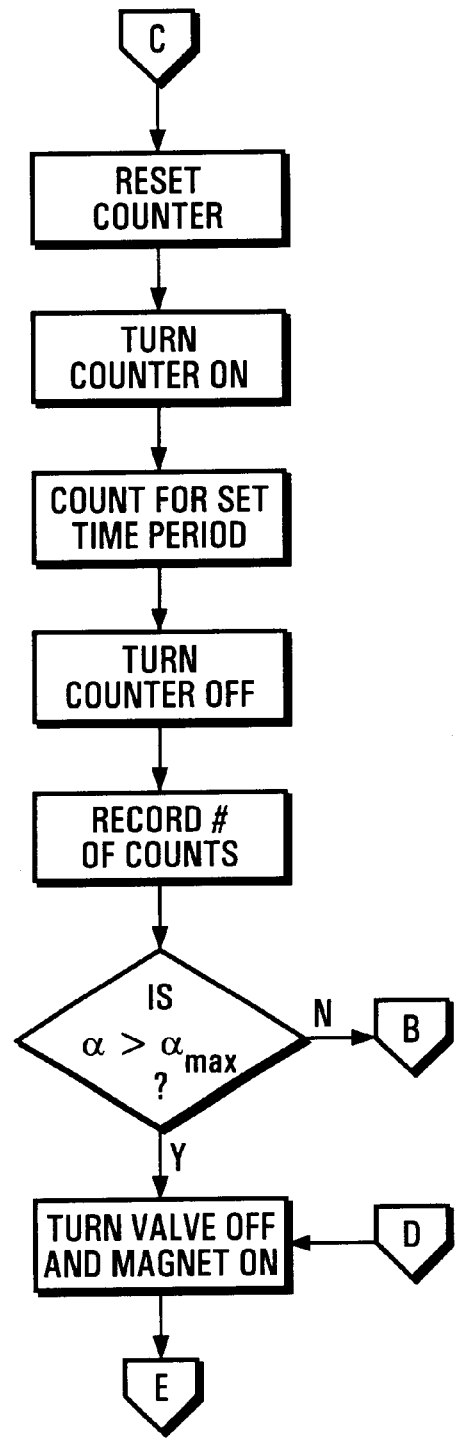
*FIG. 6A*      *FIG. 6B*

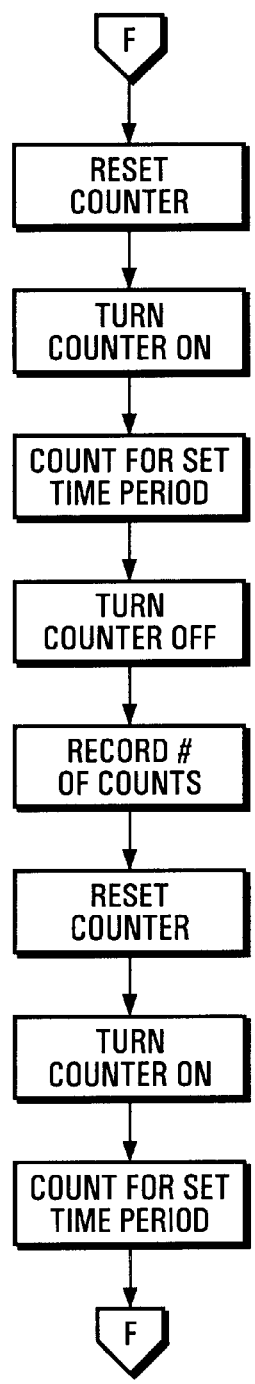
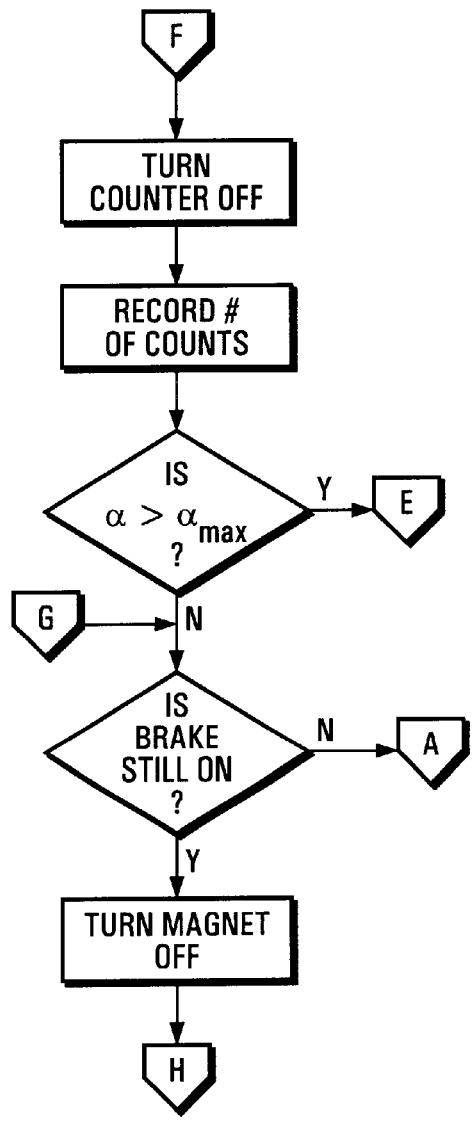
*FIG. 6C*  *FIG. 6D*

ELECTROMAGNETIC ANTILOCK BRAKE SYSTEM

BACKGROUND OF THE INVENTION

1. Field of the Invention

The present invention relates to an electromagnetic antilock brake system ("ABS") which comprises an electromagnetically actuated release arm capable of adjusting the position of a cam or other motion linkage to result in a controlled application of brake shoes to a brake drum. The invention further comprises a control system for controlling the actuation and release of the ABS.

2. Description of the Prior Art

Prior art drum brake systems comprise hydraulically actuated brake shoes which can be radially extended in order to exert a friction force against a rotating drum thereby decelerating and/or stopping a motor vehicle. Prior art ABS's comprise sensors, wheel brake cylinders, pressure modulator assemblies, a master cylinder, and an electronic control unit. Prior art wheel sensors comprise sensor units which are capable of sensing the wheel speed. Prior art pressure modulator assemblies may comprise solenoid valves, accumulators, damper chambers, orifices, and return pumps. Pressure modulators are expensive due to the number of expensive components which they comprise.

One or more prior art ABS's comprise one accumulator, one damper chamber, one orifice, and one return pump for both front brakes of a motor vehicle and one accumulator, one damper chamber, one orifice, and one return pump for both rear brakes of a motor vehicle.

In a prior art ABS, the wheel sensor detects the speed of wheel rotation. This speed is monitored by the electronic control unit. When the wheel speed decreases at a rate that would cause wheel lock up due to pressure being applied from the master cylinder, the electronic control unit uses the pressure modulator to release and reapply the pressure to the wheel cylinder to prevent complete wheel lockup.

In one or more prior art ABS's, the pressure modulator operates at a rate of 4 to 10 cycles per second (cps). In such systems, the accumulator absorbs the surge in hydraulic fluid; the damping chamber suppresses pressure oscillations; and the orifice acts as a flow restrictor. When the rate of deceleration decreases to an acceptable level, one of the solenoid valves opens such that pressure is reapplied from the master cylinder to the wheel cylinder.

In practice, current ABS's may not completely prevent wheel lockup. The wheels may alternate between lockup and rolling as the wheel cylinder pressure is modulated using prior art antilock braking systems. This wheel lock up decreases braking performance by providing a discontinuous braking torque. The frequency of modulation is limited by the response time of the mechanical parts used to control the wheel cylinder. The pulsation of fluid being pumped back to the master cylinder poses problems for some drivers who decrease pressure on the brake pedal when prior art antilock braking systems are activated. Such drivers often decrease this pressure in response to the pulsation of hydraulic fluid. The resulting decrease in pressure may turn off the antilock braking system and may reduce braking performance.

The present invention overcomes the problems of prior art antilock braking systems by employing a system that does not rely upon a pressure modulator and does not therefore result in the pulsation of hydraulic fluid present in prior art antilock braking systems.

SUMMARY OF THE INVENTION

The present invention is directed to an electromagnetic ABS. The invention comprises a backing plate comprising a central opening, a front face, and an outer region. The invention further comprises and axle extending through the central opening. The axle comprises and end region. A rotatable hub is attached to the end region of the axle. The term "attached to," as used herein, encompasses direct attachment of two components as well as indirect attachment of two components comprising intermediate components connected between the two components. The rotatable hub comprises a front face, a rear face, and ferromagnetic material.

The invention further comprises a brake shoe spring having a first end attached to the backing plate and having a second end. A brake shoe is positioned adjacent to the outer region of the front face of the backing plate and connected to the second end of the brake shoe spring, in such a manner that the brake shoe is movable radially inward or radially outward.

The invention further comprises a pivotable release arm having a first end region and a second end region. The release arm is positioned such that its movement can cause or permit the brake shoe to move radially inward or outward.

The invention further comprises an electromagnet connected to the first end region of the release arm, and positioned in close axial proximity to the hub such that the movement of the electromagnet in the rotational direction of the hub displaces the release arm, thereby causing the brake shoe to move radially inward. The term "connected to," as used herein, encompasses direct connection of two components as well as indirect connection of two components comprising intermediate components connected between the two components. The movement of the electromagnet opposite to the rotational direction of the hub causes the brake shoe to move radially outward. An electromagnetic energy source is operatively coupled to the electromagnet.

The invention further comprises a return spring having a first end attached to the face and a second end attached to the release arm, such that the movement of the electromagnet in the rotational direction of the hub places a force or moment on the spring in opposition to the force of the spring.

The invention further comprises a wheel brake cylinder mounted on the face. A hydraulically actuated piston is longitudinally mounted within the wheel brake cylinder such that the piston is extendable to push the brake shoe radially outward.

The invention further comprises a hydraulic fluid delivery line having a first end connectable to a reservoir of hydraulic fluid and a second end connected to the wheel brake cylinder such that the pressurized injection of hydraulic fluid through the line is capable of extending the hydraulically actuated piston. A solenoid valve is installed in the delivery line such that when the solenoid valve is open, pressurized hydraulic fluid can flow through the valve to the brake cylinder and when the solenoid valve is closed, pressurized hydraulic fluid cannot flow through the valve to the brake cylinder.

The invention further comprises a sensor positioned to measure the rotational speed or deceleration of the hub. The sensor is also capable of transmitting a signal indicative of hub rotational speed or deceleration. The invention further comprises a controller capable of receiving a signal from the sensor indicative of the hub rotational speed or deceleration. The controller is capable of processing this signal, comparing the signal to a predetermined value and transmitting a control signal to energize the electromagnetic source and to close the solenoid valve when the compared signal exceeds a predetermined value. The controller is further capable of deenergizing the electromagnetic energy source and opening the solenoid valve when the compared signal does not exceed a predetermined value.

DESCRIPTION OF THE DRAWINGS

FIGS. 6A–6F are a block diagram of a first preferred embodiment of the control system logic of the present invention.

DESCRIPTION OF THE PREFERRED EMBODIMENTS

Figure 1A:
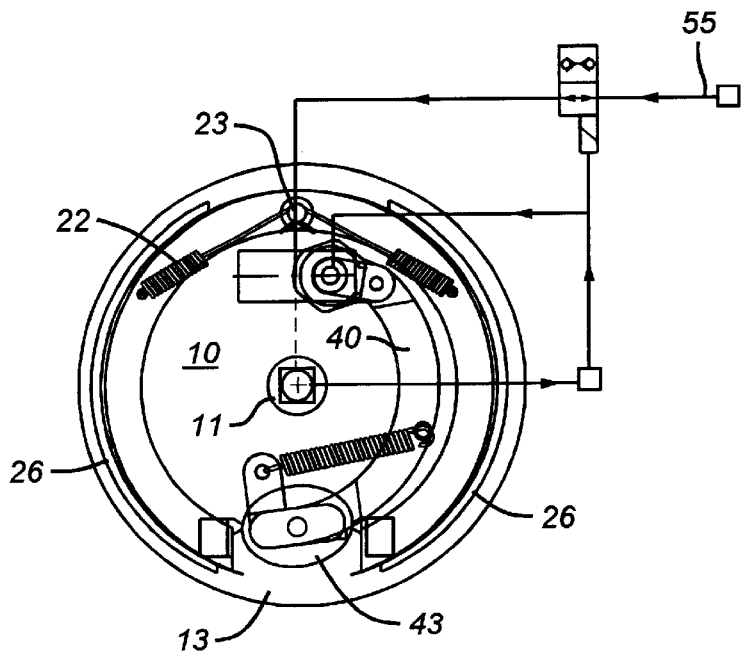
FIG. 1a is a front view of the present invention in the deenergized mode.
Figure 1B:
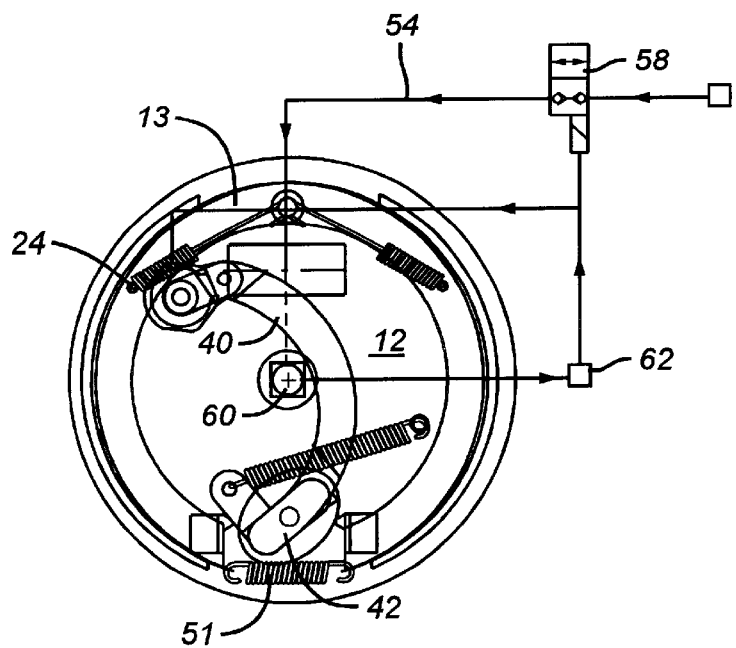
FIG. 1b is a front view of the present invention in the energized mode.
Figure 2:
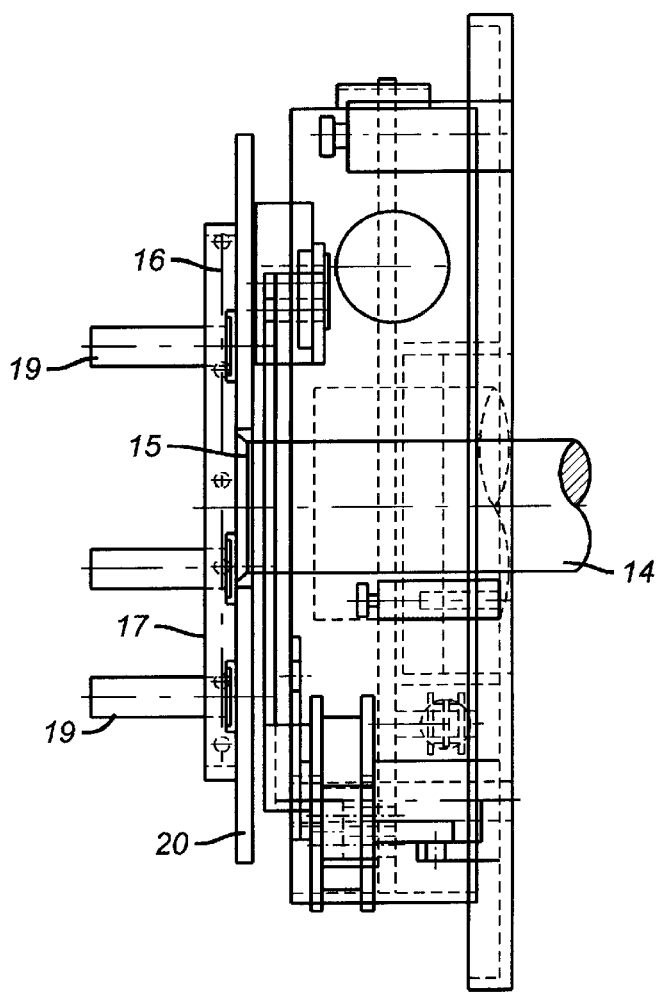
FIG. 2 is a side view of the present invention.
Figure 3B:
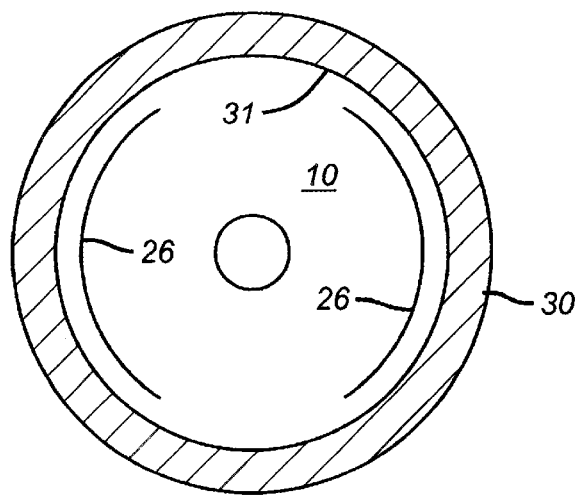
FIG. 3b is cross sectional front view of the brake drum, backing plate and brake shoe of the present invention.

The present invention is directed to an electromagnetic ABS. The invention comprises a backing plate 10 comprising a central opening 11, a front face 12, and an outer region 13, as shown in FIG. 1a and 1b. The invention further comprises an axle 14 extending through the central opening, as shown in FIG. 2. The axle comprises an end region 15, as shown in FIGS. 2 and 3b. In a preferred embodiment, the axle is rotatable. A rotatable hub 16 is attached to the end region of the axle, as shown in FIG. 2. The rotatable hub comprises a front face 17 and a rear face. In one preferred embodiment, the rotatable hub comprises a ferromagnetic material. In another preferred embodiment, the invention further comprises a steel plate 20 attached to the rotatable hub, as shown in FIG. 2. In a preferred embodiment, the rotatable hub comprises a multiplicity of extension arms 19 or lugs projecting outward from the front face having a sufficient thickness to support a brake drum.

The invention further comprises a brake shoe spring 22 having a first end 23 attached to the backing plate and having a second end 24. In a preferred embodiment, the brake shoe spring is a helical spring, as shown in FIGS. 1a and 1b. A brake shoe 26 is mounted adjacent to the outer region of the front face of the backing plate and connected to the second end of the brake shoe spring, in such a manner that the brake shoe is movable radially inward or radially outward, as shown in FIGS. 1a and 1b.

In a preferred embodiment, the invention comprises a first brake shoe and a second brake shoe placed on opposite sides of the outer region of the front face of the backing plate, as shown in FIGS. 1a and 1b. In this preferred embodiment, the first and second brake shoes are connected to the second ends of a first brake shoe spring and a second brake shoe spring, respectively, such that each brake shoe is moveable radially inward or radially outward.

In a preferred embodiment, the invention further comprises a brake drum 30 mounted on the hub. The brake drum comprises an inner braking surface 31 facing the brake shoe, as shown in FIG. 3b. In the embodiment where there are two brake shoes, the inner braking surface faces each brake shoe. The brake drum is attached to the hub such that the brake drum rotates with the hub.

Figure 3A:
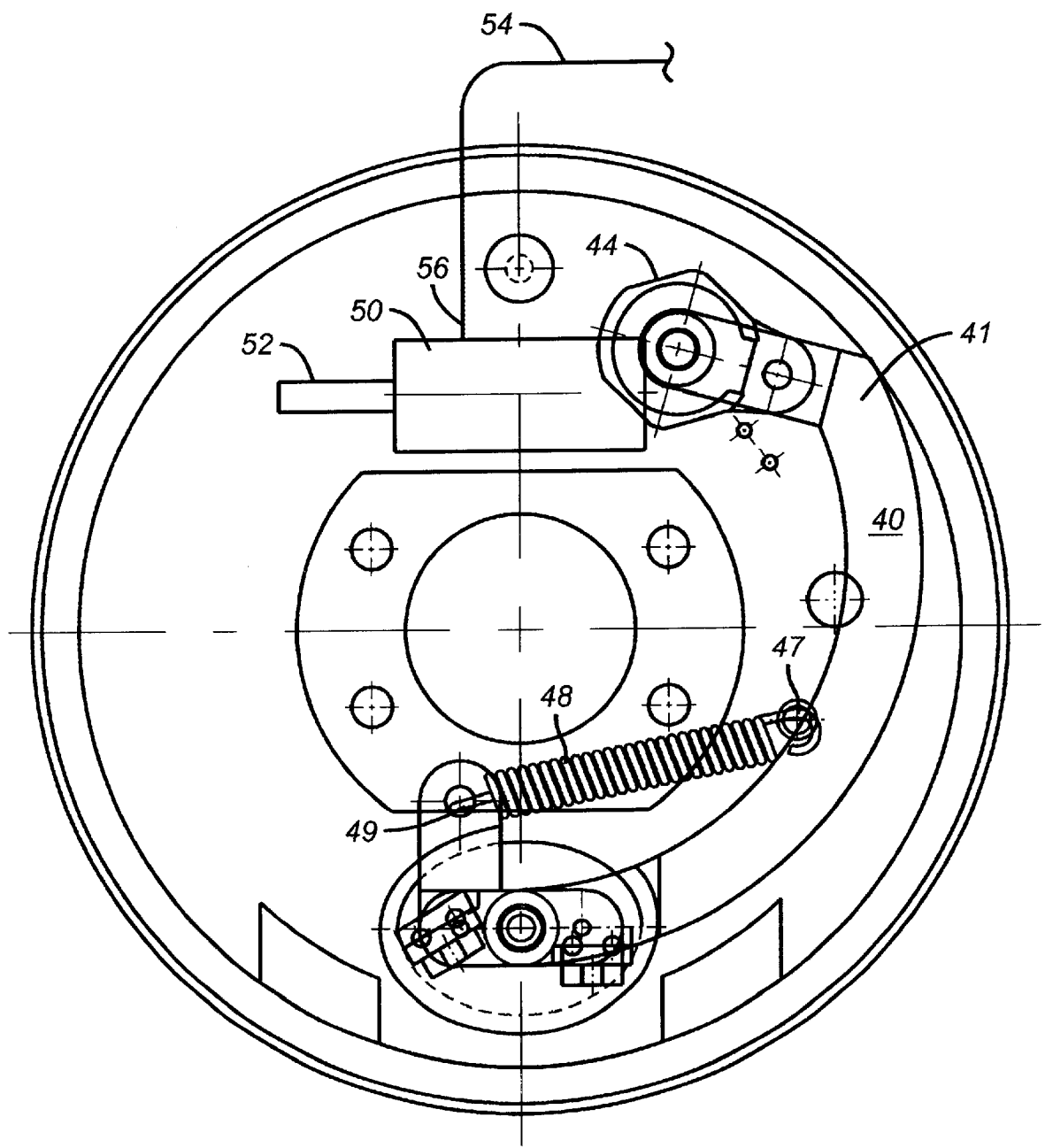
FIG. 3a is a front view of a preferred embodiment of the release arm, electromagnet, cam and return spring mbly of the present invention.

The invention further comprises a pivotable release 40 arm having a first end region 41 and a second end region 42, as shown in FIGS. 1a, 1b and 3a. The release arm is positioned such that its movement can cause or permit the brake shoe to move radially inward or outward. In a preferred embodiment, the release arm is positioned such that its movement traverses a maximum arc length of 30 degrees. In an embodiment where there are two brake shoes, the release arm is positioned such that its movement can cause or permit each brake shoe to move radially inward or outward.

In a preferred embodiment, the invention further comprises a movement linkage 43 connected to the second end region of the release arm and to the brake shoe. In a preferred embodiment, the movement linkage comprises a rotatable cam. As shown in FIGS. 1a and 1b, the cam rotates in response to rotation of the release arm. When the first end region of release arm rotates in the rotational direction of the hub, the cam is rotated, thereby permitting inward radial movement of the brake shoe, as shown in FIGS. 1a and 1b. In a preferred embodiment, the release arm is sized, shaped and positioned to traverse a maximum arc length of 30 degrees as the cam rotates through its entire range of motion.

The invention further comprises an electromagnet 44 connected to the first end region of the release arm, such that the movement of the electromagnet in the rotational direction of the hub displaces the release arm, thereby causing the brake shoe to move radially inward, as shown in FIGS. 1b and 3a. The movement of the release arm opposite to the rotational direction of the hub causes the brake shoe to move radially outward, as shown in FIG. 1a.

Figure 4:
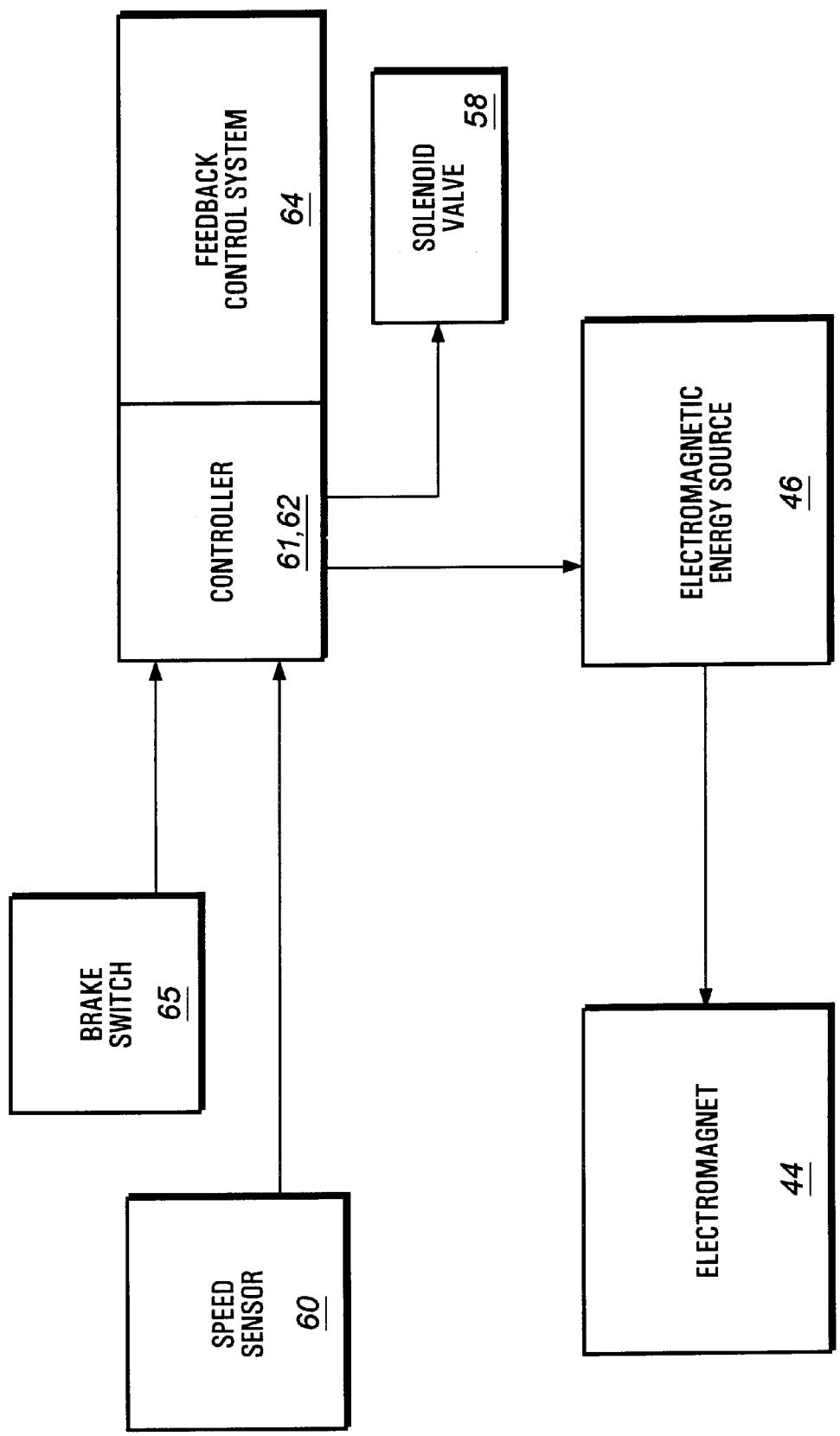
FIG. 4 is a block diagram of the control system of the present invention.

An electromagnetic energy source 46 is operatively coupled to the electromagnet, as shown in FIG. 4. In a preferred embodiment, the electromagnetic energy source is capable of sending an electrical current signal to the electromagnet in response to a control signal from the controller.

The invention further comprises a return spring 48 having a first end 47 and a second end 49 attached to the release arm, such that the movement of the electromagnet in the rotational direction of the hub places a force or moment on the spring in opposition to the force of the spring, as shown in FIG. 3a. In one preferred embodiment, the first end of the return spring is attached to the face of the backing plate.

In an embodiment comprising a movement linkage connected to the release arm, the first end of the return spring is attached to the brake shoe or the backing plate. In another preferred embodiment, where the mechanical linkage is a cam and the system comprises two brake shoes, there is a return spring and a brake shoe connecting spring 51. In this embodiment, the return spring has a first end attached to the release arm and a second end attached to the face of the backing plate. The brake shoe connecting spring is connected to the first and second brake shoes, as shown in FIG. 1b. In a preferred embodiment, the brake shoe connecting spring is connected to the lower region of each brake shoe.

The return spring may be a compression spring, a torsional spring, or a tension spring. In a preferred embodiment, the return spring is a helical spring. In a preferred embodiment, the first end of the return spring is attached to the face.

The invention further comprises a wheel brake cylinder 50 mounted on the face, as shown in FIG. 3a. A hydraulically actuated piston 52 is longitudinally mounted within the wheel brake cylinder such that the piston is extendable to push the brake shoe radially outward.

The invention further comprises a hydraulic fluid delivery line 54 having a first end 55 connectable to a reservoir of hydraulic fluid and a second end 56 connected to the wheel brake cylinder such that the pressurized injection of hydraulic fluid through the line is capable of extending the hydraulically actuated piston, as shown in FIGS. 1a and 1b. A solenoid valve 58 is installed in the delivery line such that when the solenoid valve is open, pressurized hydraulic fluid can flow through the valve to the brake cylinder and when the solenoid valve is closed, pressurized hydraulic fluid cannot flow through the valve to the brake cylinder, as shown in FIGS. 1a and 1b.

The invention further comprises a sensor 60 positioned to measure the rotational speed or deceleration of the hub, as shown in FIG. 1b. The sensor is also capable of transmitting a signal indicative of hub rotational speed or deceleration. In a preferred embodiment, the sensor is capable of transmitting pulses indicative of wheel speed to the controller. In this embodiment, the controller also comprises a pulse accumulator 61 capable of counting pulses received from the sensor.

Figure 5:
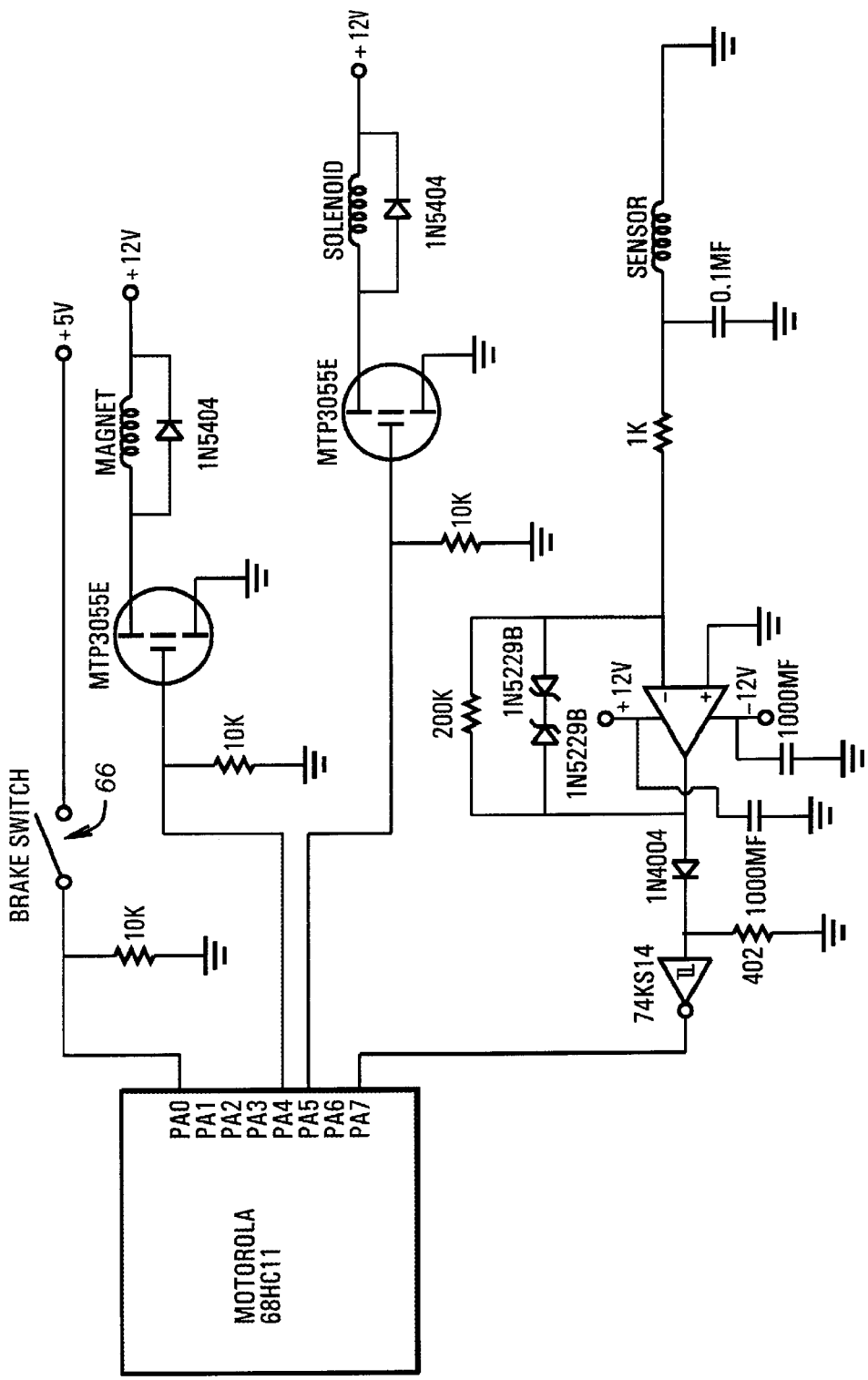
FIG. 5 is a preferred embodiment of the control circuitry of the present invention.

In a preferred embodiment, the controller is a Motorola Model 68HC11 microcontroller, as shown in FIG. 5. In a preferred embodiment, the pulses are classified into the binary logic states of zero or one using transistor transistor logic (TTL). In a preferred embodiment, a logic zero is between negative 1.5 volts and 0.2 volts, and a logic one is between 2.0 volts and 5.0 volts. In a preferred embodiment, the sensor was an Airpax Model 1-0007.

The invention further comprises a controller 62 capable of receiving a signal from the sensor indicative of the hub rotational speed or deceleration, as shown in FIGS. 1b and 4. The controller is capable of processing this signal, comparing the signal to a predetermined value and transmitting a control signal to energize the electromagnetic source and to close the solenoid valve when the compared signal exceeds a predetermined value, as shown in FIG. 4. In a preferred embodiment, the processing carried out by the controller comprises calculating any deceleration of the hub. The controller is further capable of deenergizing the electromagnetic energy source and opening the solenoid valve when the compared signal does not exceed a predetermined value.

Figures 6E, 6F:
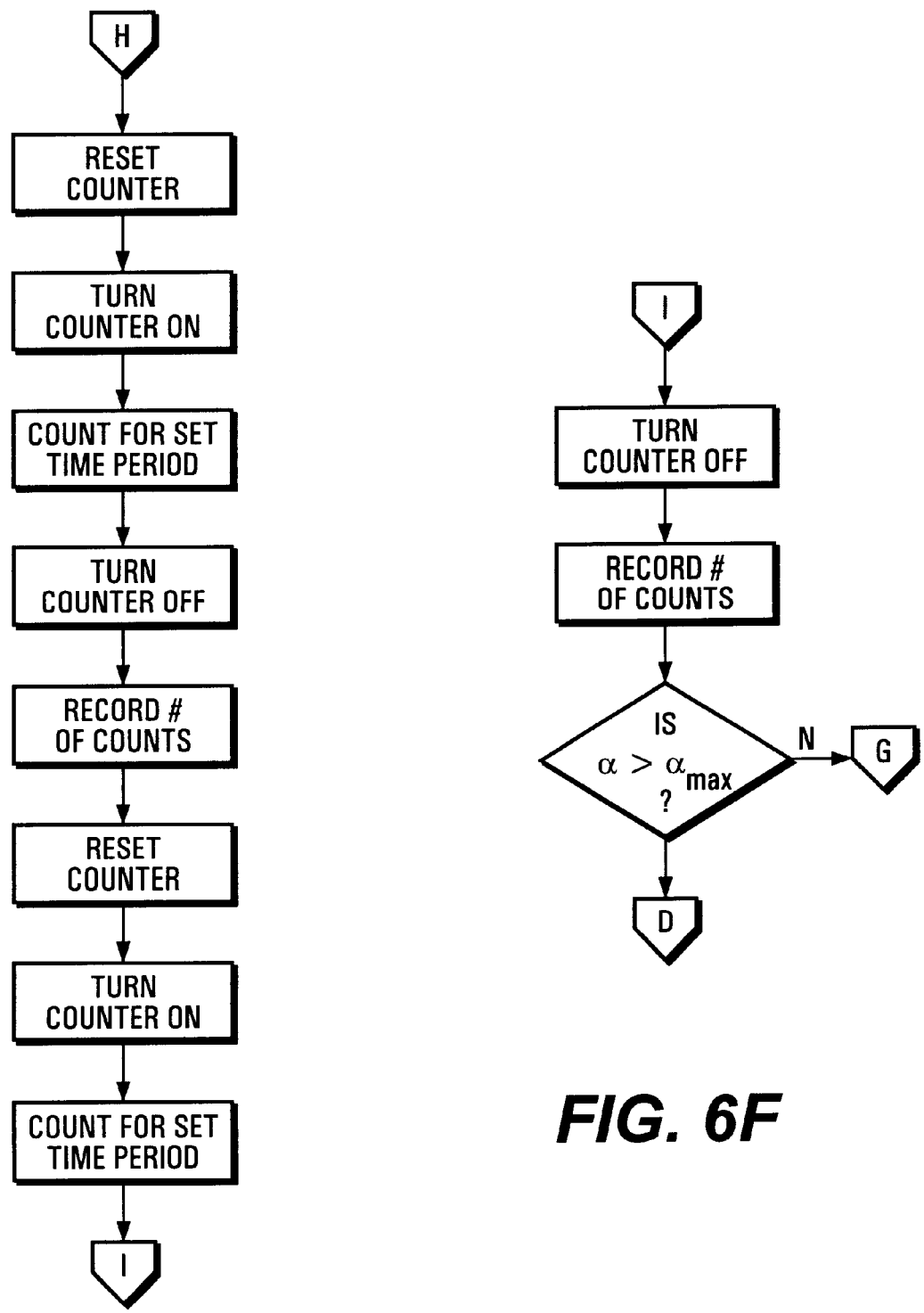
Figure 7A:
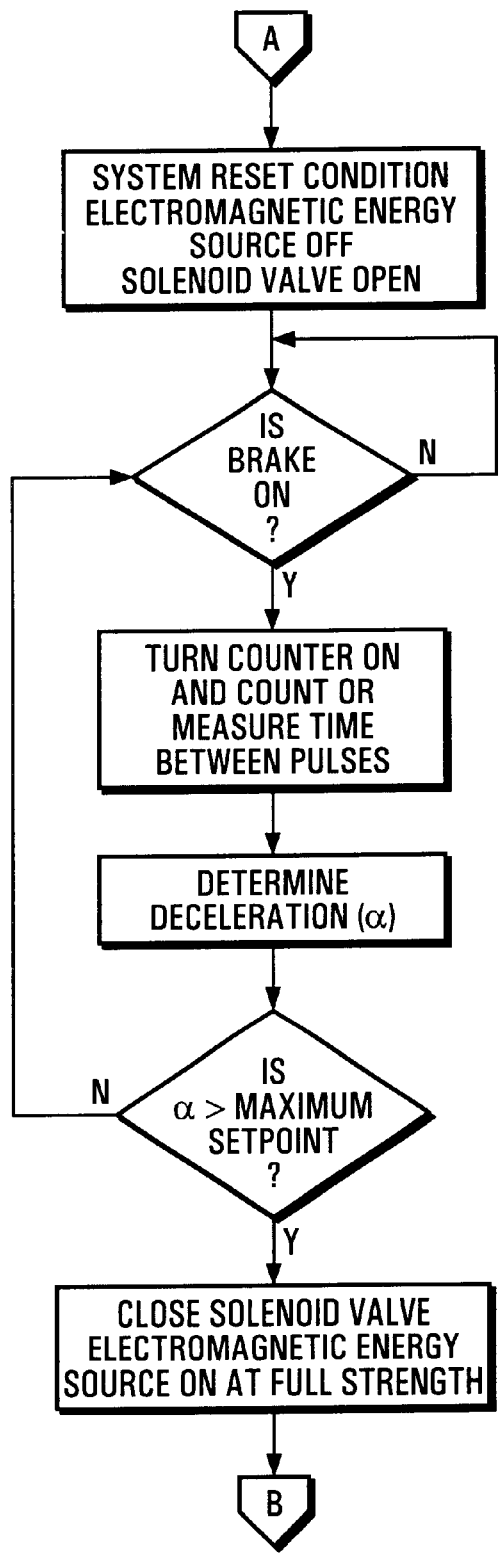
FIGS. 7A and 7B are a block diagram of a second preferred embodiment of the control system logic of the present invention.
Figure 7B:
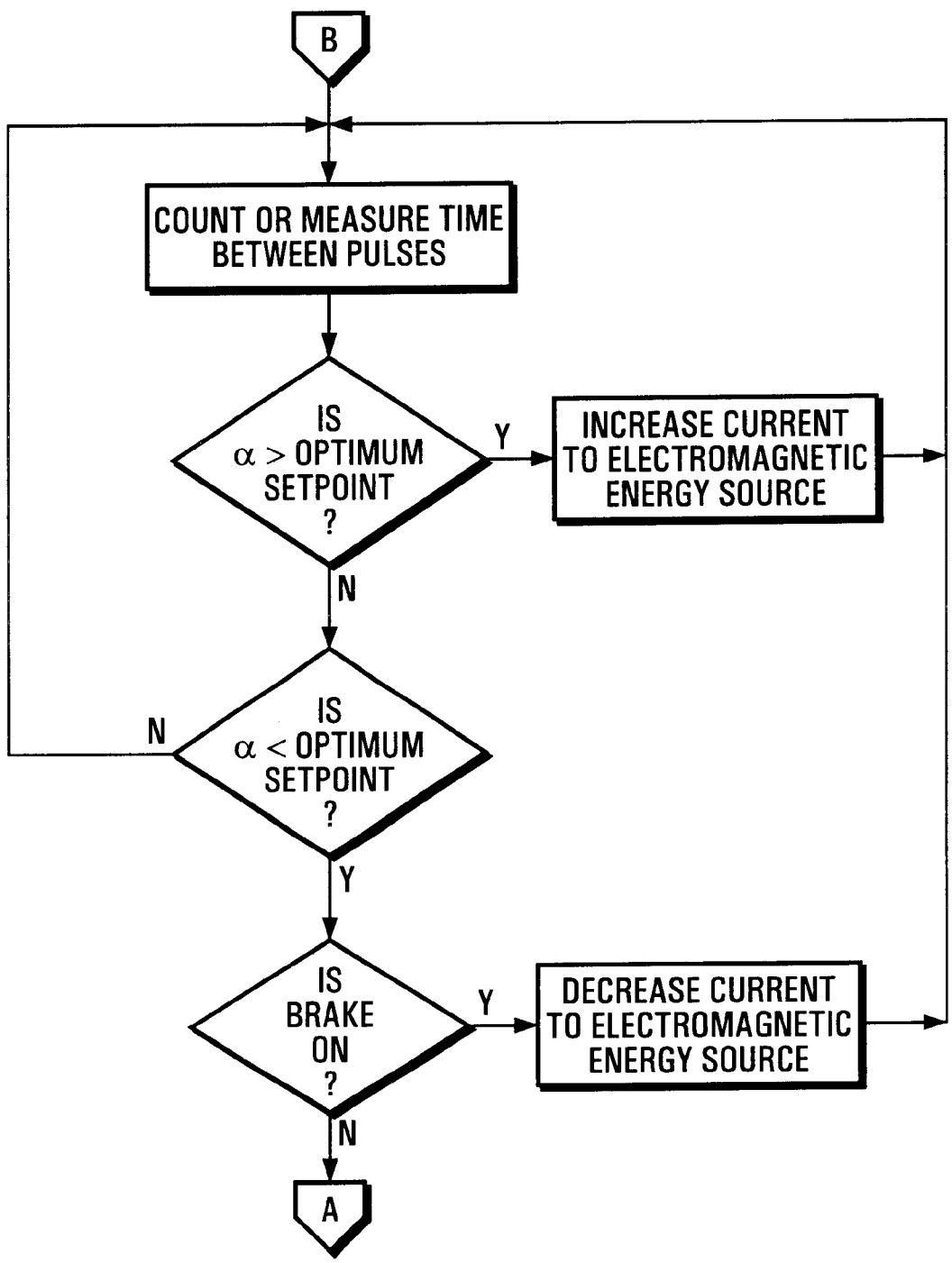

In a preferred embodiment, the controller comprises feedback control system 64 that is capable of varying the magnitude of the output signal from the electromagnetic energy source in proportion to a control signal received from the controller, as shown in FIGS. 4 and 7. In this embodiment, the strength of the electromagnetic field produced by the electromagnet is proportional to hub rotational speed or deceleration, as shown in FIG. 7. This proportionality encompasses both linear and nonlinear proportionality. Another preferred embodiment of the control system logic is shown in FIG. 6. This proportional control system provides the ability to vary the braking torque of the present invention in proportion to the rotational speed or deceleration of the hub.

In a preferred embodiment, the invention further comprises a brake switch 66 that is configured to be in the on position when the brake pedal is applied and configured to be in the off position when the brake pedal is not applied, as shown in FIG. 5. The brake switch is coupled to send a signal indicative of its position to the controller, as shown in FIG. 4. In a preferred embodiment, the controller will not send a control signal to energize the electromagnetic energy source unless the controller receives a signal from the brake switch indicating that the brake switch is on. In this same preferred embodiment, the controller will not send a control signal to close this solenoid valve unless the brake switch is on, thereby indicating that the brake pedal is applied, as shown in FIG. 6.

The foregoing disclosure and description of the invention are illustrative and explanatory. Various changes in the size, shape, and materials, as well as in the details of the illustrative construction may be made without departing from the spirit of the invention.

What is claimed is:

1. An electromagnetic antilock brake system comprising:
   a. a backing plate comprising a central opening, a front face, and an outer region;
   b. an axle extending through said central opening and comprising an end region;
   c. a rotatable hub attached to the end region of said axle, and comprising a front face, a rear face, and ferromagnetic material;
   d. a brake shoe spring having a first end attached to said backing plate and having a second end;
   e. a brake shoe mounted adjacent to the outer region of the front face of said backing plate and connected to the second end of said brake shoe spring in such a manner that said brake shoe is moveable radially outward or inward;
   f. a pivotable release arm having a first end region and a second end region, said release arm being positioned such that its movement can cause said brake shoe to move radially;
   g. an electromagnet connected to the first end region of said release arm such that the movement of said electromagnet in the rotational direction of said hub displaces said release arm, thereby causing said brake shoe to move radially inward and the movement of said electromagnet opposite to the rotational direction of said hub causes said brake shoe to move radially outward;
   h. a return spring having a first end attached to said face and a second end attached to said release arm, such that the movement of said electromagnet in the rotational direction of said hub places a force on said spring in opposition to the force of said spring;
   i. an electromagnetic energy source operatively coupled to said electromagnet;
   j. a wheel brake cylinder mounted on said face;
   k. a hydraulically actuated piston longitudinally mounted within said wheel brake cylinder such that said piston is extendable to push said brake shoe radially outward;
   l. a hydraulic fluid delivery line having a first end connectable to a reservoir of hydraulic fluid and a second end connected to said wheel brake cylinder such that the pressurized injection of hydraulic fluid through said line is capable of extending said piston;
   m. a solenoid valve installed in said delivery line such that when said solenoid valve is open, pressurized hydraulic fluid can flow through said valve to said brake cylinder and when said solenoid valve is closed, pressurized hydraulic fluid cannot flow through said valve to said brake cylinder;
   n. a sensor positioned to measure the rotational speed or deceleration of said hub and capable of transmitting a signal indicative of said speed or deceleration; and o. a controller capable of receiving a signal indicative of hub rotational speed or deceleration from said sensor, said controller being capable of processing said signal, comparing said signal to a predetermined value and outputting a control signal to said electromagnetic energy source and to said solenoid valve, said control signal being proportional to said processed signal.

2. The system of claim 1, further comprising a movement linkage connected to the second end region of said release arm and to said brake shoe.

3. The system of claim 2 wherein said movement linkage comprises a rotatable cam.

4. The system of claim 1 wherein said return spring and said brake shoe spring are helical springs.

5. The system of claim 1 wherein said axle is rotatable.

6. The system of claim 1 wherein said sensor is capable of transmitting pulses indicative of wheel speed to said controller, and said controller comprises a pulse accumulator capable of counting pulses received from said sensor.

7. The system of claim 6 wherein said processing comprises calculating any deceleration of said hub.

8. The system of claim 7 wherein said electromagnetic energy source is capable of sending an electrical current signal to said electromagnet in response to a control signal from said controller.

9. The system of claim 8 wherein said controller comprises a feedback control system that is capable of varying the magnitude of the output signal from said electromagnetic energy source in proportion to said control signal.

10. The system of claim 8 wherein the strength of the electromagnetic field produced by the electromagnet is proportional to hub rotational speed or deceleration.

11. The system of claim 1, further comprising a brake drum mounted on said hub, said brake drum comprising an inner braking surface facing said brake shoe.

12. An electromagnetic antilock brake system for a vehicle comprising a brake pedal comprising:
   a. a backing plate comprising a central opening, a front face, and an outer region;
   b. an axle extending through said central opening and comprising an end region;
   c. a rotatable hub attached to the end region of said axle and comprising a front face and a rear face;
   d. a first brake shoe spring having a first end attached to said backing plate and having a second end;
   e. a first brake shoe mounted on the outer region of the front face of said backing plate and connected to the second end of said first brake shoe spring in such a manner that said first brake shoe is moveable radially outward or inward;
   f. a second brake shoe spring having a second end attached to said backing plate and having a second end;
   g. a second brake shoe mounted on the outer region of the front face of said backing plate opposite from said first brake shoe and connected to the second end of said second brake shoe spring in such a manner that said second brake shoe is moveable radially outward or inward;
   h. a pivotable release arm having a first end region and a second end region, said release arm being positioned such that its movement can cause said brake shoes to move radially;
   i. an electromagnet connected to the first end region of said release arm, and positioned in close axial proximity to said hub such that the movement of said electromagnet in the rotational direction of said hub displaces said release arm, thereby causing said brake shoes to move radially inward and the movement of said electromagnet opposite to the rotational direction of said hub causes said brake shoes to move radially outward;
   j. a return spring having a first end attached to said face and a second end attached to said release arm, such that the movement of said electromagnet in the rotational direction of said hub places a force on said spring in opposition to the force of said spring;
   k. an electromagnetic energy source operatively coupled to said electromagnet;
   l. a wheel brake cylinder mounted on said face;
   m. a hydraulically actuated piston longitudinally mounted within said wheel brake cylinder such that said piston is extendable to push said brake shoes radially outward;
   n. a hydraulic fluid delivery line having a first end connectable to a reservoir of hydraulic fluid and a second end connected to said wheel brake cylinder such that the pressurized injection of hydraulic fluid through said line is capable of extending said piston;
   o. a solenoid valve installed in said delivery line such that when said solenoid valve is open, pressurized hydraulic fluid can flow through said valve to said brake cylinder and when said solenoid valve is closed, pressurized hydraulic fluid cannot flow through said valve to said brake cylinder;
   p. a brake shoe connecting spring connecting said first brake shoe and said second brake shoe;
   q. a sensor positioned to measure the rotational speed or deceleration of said hub and capable of transmitting a signal indicative of said speed or deceleration; and
   r. a controller capable of receiving a signal indicative of hub rotational speed or deceleration from said sensor, said controller being capable of processing said signal, comparing said signal to a predetermined value and transmitting a control signal to energize said electromagnetic energy source when the compared signal exceeds a predetermined value and to deenergize said electromagnetic energy source when the compared signal does not exceed a predetermined value.

13. The system of claim 12, further comprising a brake drum mounted on said hub, said brake drum comprising an inner braking surface facing said brake shoes.

14. The system of claim 11 further comprising a brake switch that is configured to be in the on position when the brake pedal is applied and configured to be in the off position when the brake pedal is not applied, said brake switch being coupled to send a signal indicative of its position to said controller.

15. The system of claim 14 wherein said controller will not send a control signal to energize said electromagnetic energy source unless said controller receives a signal from said brake switch indicating that said brake switch is on.

16. The system of claim 12, wherein said return spring is a tension spring.

17. An electromagnetic antilock brake system comprising:
   a. a backing plate comprising a central opening, a front face, and an outer region;
   b. an axle extending through said central opening and comprising an end region;
   c. a rotatable hub attached to the end region of said axle, and comprising a front face, a rear face, and ferromagnetic material;
   d. a brake shoe spring having a first end attached to said backing plate and having a second end;

e. a brake shoe mounted adjacent to the outer region of the front face of said backing plate and connected to the second end of said brake shoe spring in such a manner that said brake shoe is moveable radially outward or inward;

f. a pivotable release arm having a first end region and a second end region, said release arm being positioned such that its movement can cause said brake shoe to move radially;

g. a rotatable cam attached to the second end of said release arm such that rotation of the first end region of said release arm in the rotational direction of said hub causes said cam to rotate thereby permitting inward axial movement of said brake shoe;

h. an electromagnet connected to the first end region of said release arm such that the movement of said electromagnet in the rotational direction of said hub displaces said release arm, thereby causing said brake shoe to move radially inward and the movement of said electromagnet opposite to the rotational direction of said hub causes said brake shoe to move radially outward;

i. a return spring having a first end attached to said face and a second end attached to said release arm, such that the movement of said electromagnet in the rotational direction of said hub places a moment on said spring in opposition to the force of said spring;

j. an electromagnetic energy source operatively coupled to said electromagnet;

k. a wheel brake cylinder mounted on said face;

l. a hydraulically actuated piston longitudinally mounted within said wheel brake cylinder such that said piston is extendable to push said brake shoe radially outward;

m. a hydraulic fluid delivery line having a first end connectable to a reservoir of hydraulic fluid and a second end connected to said wheel brake cylinder such that the pressurized injection of hydraulic fluid through said line is capable of extending said piston;

n. a solenoid valve installed in said delivery line such that when said solenoid valve is open, pressurized hydraulic fluid can flow through said valve to said brake cylinder and when said solenoid valve is closed, pressurized hydraulic fluid cannot flow through said valve to said brake cylinder;

o. a sensor positioned to measure the rotational speed or deceleration of said hub and capable of transmitting a signal indicative of said speed or deceleration; and p. a controller capable of receiving a signal indicative of hub rotational speed or deceleration from said sensor, said controller being capable of processing said signal, comparing said signal to a predetermined value and transmitting a control signal to energize said electromagnetic energy source when the compared signal exceeds a predetermined value and to deenergize said electromagnetic energy source and to open said solenoid valve when the compared signal does not exceed a predetermined value.

18. The system of claim 17 wherein said sensor is capable of transmitting pulses indicative of wheel speed to said controller, and said controller comprises a pulse accumulator capable of counting pulses received from said sensor.

19. The system of claim 17 further comprising a brake switch coupled to said controller, said switch being configured to be in the on position when the brake pedal is applied and configured to be in the off position when the brake pedal is not applied.

20. The system of claim 19, wherein the controller will not send a control signal to close said solenoid valve or energize said electromagnet unless the brake switch is in the on position.

* * * * *